United States Patent Office 3,437,700
Patented Apr. 8, 1969

3,437,700
MANUFACTURE OF ALCOHOLS
Herbert Niggebrugge, Arthez de Bearn, France, assignor to Societe Nationale des Petroles d'Aquitaine, Courbevoie, France
No Drawing. Filed Nov. 12, 1965, Ser. No. 507,573
Claims priority, application France, Nov. 13, 1964, 994,751
Int. Cl. C07c 29/00
U.S. Cl. 260—642                              4 Claims

ABSTRACT OF THE DISCLOSURE

There is provided a novel process for the preparation of aliphatic alcohols suitably in the range of alcohols having between 3 and 23 carbon atoms per molecule. The process comprises the telomerization of lower aliphatic alcohols by heating said alcohols with olefins in the presence of sulfide initiators.

---

This invention relates to a new process for the manufacture of alcohols including particularly higher aliphatic alcohols. It is concerned more especially with the preparation of aliphatic alcohols by telomerisation between alcohols and olefines. The invention also covers alcohols, particularly mixtures of alcohols, which have been produced by this process.

It is known to manufacture alcohols by telomerisation between alcohols and olefines in the presence of oxygen-based initiators, such as oxygen itself, hydrogen peroxide or organic peroxides. Oxygen and hydrogen peroxide, which have the advantage of permitting the use of temperatures higher than 200° C., are, however, invariable initiators, that is to say they do not permit of control on the nature of the alcohols produced; moreover, they lead to the production of relatively high proportions of heavy alcohols having more than about 23 carbon atoms in the molecule.

The organic peroxides themselves in principle permit certain variations, since a range of radicals of different natures exists, but these peroxides cannot be used in practice above 200° C., because of their thermal instability. Moreover, below this temperature, the telomerisation leads to the formation of a high proportion of very long chain alcohols, which is generally undesirable. Moreover, the organic peroxides must be used in fairly large proportions, because there are only formed a few molecules of the most wanted alcohols (from $C_3$ to $C_{23}$) per molecule of the peroxide. For example, in the reaction between ethylene and methyl alcohol, generally only 2 to 4 mols of such alcohols are obtained per mol. of initiator. Thus, apart from the disadvantages referred to, the use of an organic peroxide becomes costly, all the more so because such peroxides are fairly high in price.

The present invention provides important advantages, as compared with the use of the known initiators which have been mentioned above. It permits the telomerisation to be carried out at fairly high temperatures, particularly above 300° C., in order to obtain a considerably increased proportion of $C_3$ to $C_{23}$ alcohols with excellent yields. The new initiators forming the subject of the invention can lead to the formation of a large proportion, for example, of 5 to 10 moluecules of desired alcohols per mol. of initiator, the proportion of heavy residues being very small. On the other hand, the initiators of the invention have the advantage that they can be selected from a very wide range of compounds having radicals which can often be modified at will.

The new process according to the invention for the production of aliphatic alcohols includes reacting an aliphatic alcohol of lower molecular weight with an olefin in the presence of an initiator wherein the initiator used is an organic sulphide.

The reaction is generally conducted at temperatures between 260° and 400° C., with a preferential range of 300° to 360° C. Furthermore, the temperature is chosen according to the nature of the particular organic sulphide used as the initiator.

Obviously, the pressure of the reaction system depends on the temperature and the nature of the reagents; in the most usual case of telomerisation of ethylene with methyl alcohol, at the preferred temperatures of from 300° to 360° C., the pressure is generally about 200 to 500 atm., when it is particularly desired to obtain alcohols having from 3 to 23 carbons in the molecule.

It is possible for a large number of organic sulphides to be used as initiators when carrying out the invention, including particularly aliphatic, arylic or araliphatic, cycloaliphatic or other sulphides. Dimethyl, diethyl, dipropyl, dibutyl, dipentyl, dihexyl, diheptyl, dioctyl and other sulphides, for example, are suitable and these different alkyls may be normal or have a more or less branched chain. On the other hand, the alkyls may carry aromatic or other substituents, for example phenyls, cyclohexyls, etc., and thus it is possible to use, inter alia, the di-($\alpha$-phenylethyl)-sulphide.

Among the different organic sulphides which can be used, there are to be considered the dithianes and the trithianes and other similar sulphides, including for example 2,2,7,7-tetramethyl-3,6-dithiooctane, trithiane-(1,3,5-trithiocyclohexane), dimethylsulphide and others.

The proportions of initiators can vary; for example between 1 and 20 mols. per 1000 mols. of alcohol and preferably between 2 and 10 mols. per 1000 mols. of alcohol can be used.

In order to illustrate the invention, examples of the telomerisation of ethylene with methanol are given below, but is to be understood that the invention is not limited to these reagents and that it can be carried out starting with other alcohols and other olefines

Example I

A mixture of 500 g. of methanol and 11 g. of di-($\alpha$-phenylethyl) sulphide was introduced into a 1500 ml. autoclave. With the autoclave closed, ethylene was introduced into it up to a pressure of 30 atm., after which this ethylene was allowed to escape; this cleansing operation was repeated twice in order to expel the air initially contained in the autoclave.

The ethylene was then injected up to a pressure of 40 atm. and the autoclave was heated to 330° C. The pressure reached a maximum value of 322 atm. and then decreased regularly. The temperature was raised to 350° C.; after a reaction period of 6 hours, the pressure fell to 280 atm. The heating was then stopped and the remaining ethylene was degasified. 470 g. of yellow liquid were recovered from the autoclave and this was subjected to distillation; this latter left a residue of 91.8 g. of a yellow liquid with an odour of fatty alcohols, the boiling point of which exceeded 75° C.

Five other identical preparations were carried out with the same reagent at temperatures from 330° to 350° C., under pressures, on starting the reaction, of 340 to 400 atm., for 4 to 7 hours; the liquid residues of these 5 preparations were combined with those of the first and the mixture was subjected to fractionated distillation, the results of which are indicated in the following Table 1.

In this table, the vertical column I indicates the order numbers of the fractions investigated; column II gives the weight thereof in grams; column III indicates the distillation ranges in ° C., at the pressure indicated in mm. Hg; column IV gives the refractive indices. The expression percent OH in column V indicates the number of grams of OH— groups per 100 g. of distilled product, while N in column VI is the molecular weight, determined by cryoscopy; the term percent alcohol in column VII indicates (percent OH)×M/17.

TABLE 1

| I | II | III | IV | V | VI | VII |
|---|---|---|---|---|---|---|
| Fraction | G. | °C./mm. Hg | $N_D^{20°}$ | Percent OH | M | Percent alcohol |
| Total | 554 | >75/760 | 1.4400 | 9.0 | 111 | 59 |
| 1st | 23.7 | 64–68/760 | 1.3385 | 49.0 | 36 | 104 |
| 2nd | 23.5 | 68–85/760 | 1.3732 | 22.3 | | |
| 3rd | 27.7 | 85–100/760 | 1.3870 | 24.0 | 64 | 90 |
| 4th | 63.5 | 100–150/760 | 1.4130 | 15.7 | 90 | 83 |
| 5th | 40.3 | 150–170/760 | 1.4310 | 8.9 | 120 | 63 |
| 6th | 45.7 | 40–65/1.5 | 1.4400 | 3.9 | 140 | 32 |
| 7th | 79.0 | 65–80/1.5 | 1.4440 | 5.2 | 150 | 46 |
| 8th | 54.9 | 80–100/1.5 | 1.4534 | 3.9 | 180 | 41 |
| 9th | 53.0 | 100–120/1.5 | 1.4650 | 3.2 | 200 | 38 |
| 10th | 46.0 | 123–145/93 | 1.4740 | 2.4 | 240 | 34 |
| 11th | 56.8 | 116–205/0.1 | 1.4730 | 2.5 | 300 | 44 |

After the last fraction, 26.5 g. of residues remained.

Example II

By way of comparison, a telomerisation of methanol with ethylene was carried out in the presence of di-tert.-butyl peroxide under the predetermined best conditions, namely:

500 g. of methanol
10 g. of peroxide
T=140° C.
Pressure drop: 90 to 31 atm.

The results of this preparation are set out in Table 2, alongside those of the previous test.

TABLE 2

| Fractions | Initiator | |
|---|---|---|
| | Di-(alpha-phenyl-ethyl)-sulphide (g.) | t-Butyl peroxide (g.) |
| 90°–200° C./760 mm | 32 | 0 |
| Up to 200°/20 mm | 31.8 | 19.5 |
| Up to 200°/0.2 mm | 8.6 | 41.7 |
| Above 200°/0.2 mm | 8.8 | 98 |
| Total of the first three fractions | 72.4 | 51.2 |

It will be seen that the use of organic sulphides in accordance with the invention gives results which are very different and advantageous, as compared with those where peroxide is used. The production of lighter products is much greater, while the undesirable fraction of heavy products is greatly reduced, being 8.8 g. instead of 98 g. with the peroxide.

Example III

On the basis of the alcohols obtained according to Example I, the proportion of the primary, secondary and tertiary alcohols was established, this leading to the following results:

| | Percent |
|---|---|
| Primary alcohols | 72.7 |
| Secondary alcohols | 20.7 |
| Tertiary alcohols | 6.6 |

It was, moreover, established that this distribution is substantially always the same with different preparations carried out in accordance with the invention.

Examples IV to XVI

In a series of preparations, the nature of the organic sulphide employed as initiator was varied, as was also the molar proportion of the latter with respect to the methanol, the temperature and the pressure. The olefine was ethylene. Adopted as criterion of the result was the weight of the fraction distilling above 70° C.

These tests are summarized in Table 3.

TABLE 3

| Test No. | Initiator | $CH_3OH$ (g.) | Mol of initiator | T., °C. | Atm. | Fraction >70° C. (g.) |
|---|---|---|---|---|---|---|
| 4 | Dimethyl sulphide | 470 | 0.15 | 250–280 | 300–400 | 16 |
| 5 | do | 470 | 0.148 | 300 | 400–340 | 38.2 |
| 6 | do | 470 | 0.156 | 344 | 308–360 | 95 |
| 7 | Diethyl sulphide | 500 | 0.079 | 320 | 360–330 | 42 |
| 8 | do | 500 | 0.079 | 360 | 430–320 | 135 |
| 9 | Dipropyl sulphide | 500 | 0.039 | 330 | 340–280 | 27 |
| 10 | Dibutyl sulphide | 470 | 0.075 | 250 | 300 250 | 11.4 |
| 11 | do | 470 | 0.075 | 300 | 370–345 | 27.6 |
| 12 | do | 470 | 0.075 | 330–380 | 400–270 | 126 |
| 13 | t.-Butyl sulphide | 470 | 0.075 | 250 | 310–290 | 34 |
| 14 | do | 470 | 0.075 | 300 | 280–220 | 142 |
| 15 | 2,2,7,7-tetramethyl-3,6-dithiooctane | 500 | 0.039 | 330 | 335–315 | 38.4 |
| 16 | Trithiane-(1,3,5-trithiocyclohexane) | 500 | 0.039 | 330 | 330–308 | 38.8 |

What I claim is:

1. A process for the preparation of aliphatic alcohols which comprises telomerizing methanol, with ethylene by heating the reagents at a temperature of 260° to 400° C. under a pressure of from 150 to 400 atmospheres with an initiator selected from the group consisting of dialkyl sulfides having from 1 to 8 carbon atoms in the alkyl moiety, 2,2,7,7-tetramethyl-3,6-dithiooctane and trithiane.

2. A process according to claim 1, in which the initiator is an alkyl sulphide containing 1 to 4 carbon atoms.

3. A process according to claim 1, in which the reaction takes place between 300° and 360° C.

4. A process according to claim 1, in which the proportion of initiator is from 1 to 20 mols per 1000 mols of methanol.

References Cited

UNITED STATES PATENTS

| | | |
|---|---|---|
| 2,402,137 | 6/1946 | Hanford et al. |
| 2,668,181 | 2/1954 | Banes et al. _____ 260—642 |
| 2,810,687 | 10/1957 | Rueggeberg et al. |
| 2,852,565 | 9/1958 | Nozaki. |
| 2,930,815 | 3/1960 | Nedwick et al. |

OTHER REFERENCES

Sosnovsky: "Free Radical Reactions in Prep. Org. Chem." (1964), pp. 66 to 79.

Hawkins: "Organic Peroxides" (1961), pp. 14 to 17.

Reid: "Org. Chem. of Bivalent Sulfur," vol. III (1960), pp. 61 to 64, 79 and 369 to 370. QD 412S1 R4.

LEON ZITVER, *Primary Examiner.*

J. E. EVANS, *Assistant Examiner.*